HEISS & SCHMIDT.
Coffee Pot.
No. 91,333.
Patented June 15, 1869.
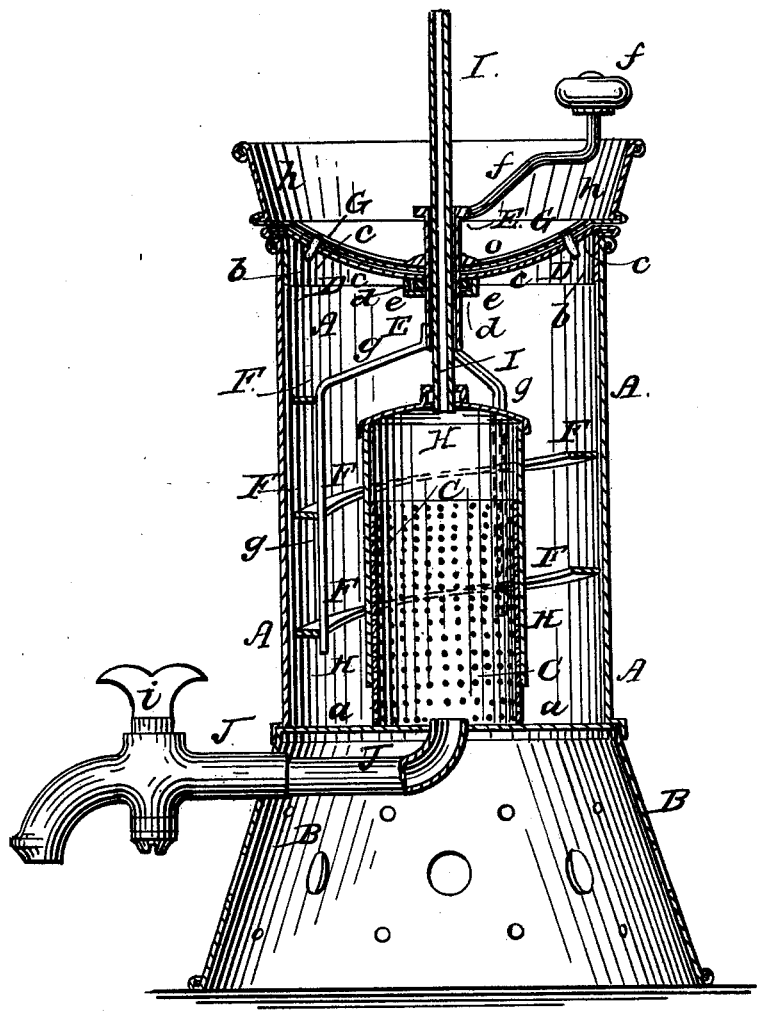

United States Patent Office.

GREGOR HEISS AND MARTIN SCHMIDT, OF HOUSTON, TEXAS.

Letters Patent No. 91,333, dated June 15, 1869.

COFFEE AND TEAPOT.

The Schedule referred to in these Letters Patent and making part of the same.

*To all whom it may concern:*

Be it known that we, GREGOR HEISS and MARTIN SCHMIDT, of Houston, in the county of Harris, and State of Texas, have invented a new and improved Coffee and Teapot; and we do hereby declare that the following is a full, clear, and exact description thereof, which will enable others skilled in the art to make and use the same, reference being had to the accompanying drawing, forming part of this specification.

The drawing represents a sectional elevation of our improved coffee and teapot.

This invention relates to a new apparatus for producing extracts from coffee, tea, and other substances, and for, at the same time, straining the same; and consists of a novel construction of the interior devices, by which the substance to be treated is at first thoroughly stirred in the boiling water, and then properly strained, so that a pure and wholesome extract may be produced.

A, in the drawing, represents the cylindrical vertical vessel in which the substance to be treated and the boiling water are to be contained.

This cylinder has a closed bottom, $a$, and is elevated by a lower support, B, so that the bottom $a$ will not rest on the table or ground.

Within the vessel A is arranged, upon the bottom, a small upright concentric perforated cylinder, C.

D is the cover of the cylinder A, fitted, with its flange $b$, into or around the cylinder, and provided with a concave (that is, depressed) top plate, $c$.

Through the cover is fitted, in the centre, a tube, E, which is, by a projecting shoulder, $d$, swivelled in a small box, $e$, that is formed on the under side of the cover.

The tube E projects from the upper and lower sides of the cover, and has, at its upper end, a projecting handle, $f$, by means of which it can be turned in the cover.

To the lower end of the tube E, is, under the cover D, secured, by means of arms, or bars, $g$ $g$, a spiral plate, F, which fits against the sides of the cylinder A, as shown.

Upon the cover is placed a plate, G, of similar shape as the top plate $c$, and provided with an upward-projecting rim, $h$, so that it forms a kind of funnel.

The plates $c$ and G are both perforated, and the upper plate can be turned on the cover to bring the said apertures in line, or to close them, as may be desired.

H is a cylindrical cap, of such size that it can be fitted around or within the perforated cylinder C. It has a tubular upright shank, I, projecting from its cover through the tube E, so that it can, by means of said tube, be readily raised or lowered.

J is a pipe, projecting from the bottom $a$ through the side of the support B, and having a suitable cock, $i$, as shown.

The coffee, tea, or other substance to be treated is placed into the cylinder A, the cap H is let down over the strainer-cylinder C, and the upper plate G turned, to bring its apertures into line with those of the covering-plate $c$.

The water is then poured into the upper funnel, and flows into the cylinder A, and becomes mixed with the coffee or tea in the same. The handle $f$ is then revolved, to turn the tube E, and with it the spiral plate F, whereby the coffee or tea is thoroughly stirred in the water.

The cap H is then raised, so that the water will enter the strainer-cylinder C, into which the pipe J enters.

The cock $i$ can then, at any time, be opened to withdraw as much of the extract as may be desired.

The apertures of the plate $c$ are closed as soon as the proper quantity of water has been poured into the cylinder.

The tube I serves at all times to let the superfluous steam escape.

Having thus described our invention,

What we claim as new, and desire to secure by Letters Patent, is—

1. A coffee or teapot, consisting of the cylinder A, internal permanent strainer C, and discharge-pipe J, all combined and operating substantially as herein shown and described.

2. The spiral stirrer-plate F, when suspended from the tube E, that is, swivelled in the cover of the pot, so that it can be freely revolved, substantially as herein shown and described.

3. The sliding cap H, when arranged in connection with the permanent strainer C, so that it can be let down to close the perforations of the same, substantially as herein shown and described.

4. The tubular shank I, of the adjustable cap H, when arranged to serve as a handle and steam-escape pipe, substantially as herein shown and described.

5. The double perforated cover D G, having the rim $h$, and supporting the swivel-tube E, substantially as herein shown and described.

6. The combination of the vessel A, strainer C, pipe J, and double perforated cover D G, with the spiral stirrer F, swivel-tube E, handle $f$, adjustable cap H, and tubular handle I, all arranged and operating substantially as herein shown and described.

GREGOR HEISS.
MARTIN SCHMIDT.

Witnesses:
CHAS. G. MAIR,
J. F. VOLLE.